(12) United States Patent
Khay-Ibbat et al.

(10) Patent No.: US 9,338,718 B2
(45) Date of Patent: May 10, 2016

(54) VOICE CALL RESUMPTION ON A LEGACY NETWORK

(71) Applicant: Apple Inc., Cupertino, CA (US)

(72) Inventors: Samy Khay-Ibbat, San Francisco, CA (US); Sarma V. Vangala, San Jose, CA (US); Sreevalsan Vallath, Dublin, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 13/890,026

(22) Filed: May 8, 2013

(65) Prior Publication Data

US 2014/0269624 A1     Sep. 18, 2014

Related U.S. Application Data

(60) Provisional application No. 61/785,598, filed on Mar. 14, 2013.

(51) Int. Cl.
*H04W 36/30* (2009.01)
*H04W 36/14* (2009.01)

(52) U.S. Cl.
CPC ............. *H04W 36/30* (2013.01); *H04W 36/14* (2013.01)

(58) Field of Classification Search
CPC .............................. H04W 36/30; H04W 24/10
USPC .................................. 370/252, 280, 352, 401
See application file for complete search history.

(56) References Cited

U.S. PATENT DOCUMENTS

| | | | |
|---|---|---|---|
| 2006/0111114 A1* | 5/2006 | Marin et al. | 455/442 |
| 2007/0041367 A1 | 2/2007 | Mahdi | |
| 2007/0171894 A1* | 7/2007 | Han | 370/352 |
| 2008/0205413 A1* | 8/2008 | Purnadi et al. | 370/401 |
| 2011/0292821 A1 | 12/2011 | Chin et al. | |
| 2012/0134340 A1 | 5/2012 | Lei | |
| 2012/0257549 A1* | 10/2012 | Chin et al. | 370/280 |
| 2013/0010696 A1* | 1/2013 | Mildh | 370/328 |
| 2014/0119209 A1* | 5/2014 | Joul | 370/252 |

FOREIGN PATENT DOCUMENTS

| | | |
|---|---|---|
| WO | WO 2011139045 | 10/2011 |
| WO | WO 2013048189 | 4/2013 |

* cited by examiner

*Primary Examiner* — Andrew Chriss
*Assistant Examiner* — Peter Mak
(74) *Attorney, Agent, or Firm* — Downey Brand LLP

(57) ABSTRACT

A method for resuming a voice call on a legacy network is provided. The method can include a wireless communication device establishing a voice call with a remote device over a first cellular network; determining that a connection quality of the first cellular network has dropped below a threshold connection quality; sending a notification that the wireless communication device is releasing the voice call to transition to a legacy cellular network and will resume the voice call on the legacy cellular network; releasing the voice call on the first cellular network; transitioning to the legacy cellular network; establishing a second voice call with the remote device on the legacy cellular network; and using the second voice call to resume the voice call with the remote device.

25 Claims, 8 Drawing Sheets

VOICE CALL RESUMPTION ON A LEGACY NETWORK

CROSS-REFERENCE TO RELATED APPLICATIONS

This application claims the benefit under 35 U.S.C. 119(e) of U.S. Provisional Patent Application No. 61/785,598, filed on Mar. 14, 2013, which is incorporated herein in its entirety by reference.

FIELD OF THE DESCRIBED EMBODIMENTS

The described embodiments relate generally to wireless communications and more particularly to resuming a voice call on a legacy network.

BACKGROUND

Wireless communication devices and supporting cellular networks continue to evolve at a rapid pace to support additional functionality, including a wide array of data services and faster data rates. Among the data services supported over some modern cellular networks, such as Long Term Evolution (LTE) networks, is the servicing of voice calls via a packet switched domain. For example, some LTE networks provide a service known as voice over LTE (VoLTE), in which voice calls can be serviced as packet switched calls via a voice over Internet Protocol (VoIP) connection.

However, LTE coverage is not yet universal and, as such, LTE networks are being co-deployed in overlapping regions with legacy cellular networks that support voice calls via a circuit switched domain. In this regard, wireless communication devices may transition between cellular radio access technologies (RATs) as a result of moving in and out of LTE coverage due to device mobility.

For a wireless communication device with an active voice call, transitioning between a network, such as an LTE network, that services voice calls as packet switched data sessions and a legacy network servicing voice calls as circuit switched calls can be somewhat complex. Some network operators support technology, such as single radio voice call continuity (SRVCC), to enable transitioning an active voice call between an LTE network and a legacy network. However, some network operators do not support SRVCC or other call transition mechanism, opting instead to attempt to provide universal LTE coverage for voice calls. Unfortunately, at least early in the stages of deployment of modern networks, the aspiration of providing universal LTE coverage is unlikely to be met. As such, a device moving outside of the footprint of LTE coverage during a voice call, will experience a call drop in networks that do not support SRVCC or other mechanism to transition an active voice call to a legacy network. This experience can be frustrating for users, who will have to manually reestablish the voice call following such call drops.

SUMMARY OF THE DESCRIBED EMBODIMENTS

Some example embodiments disclosed herein facilitate resumption of a voice call on a legacy network. In this regard, some example embodiments provide a wireless communication device configured to proactively release a voice call on a first cellular network and reestablish the voice call on a legacy cellular network after transitioning to the legacy cellular network due to a connection quality of the first cellular network. In some example embodiments, reestablishment of the voice call can be coordinated between the wireless communication device and another device participating in the call and can be automatically handled in the background such that users participating in the voice call do not have to manually expend effort to reestablish the voice call. In this regard, while a user may notice a relatively brief interruption in audio transmission for the voice call, the user of a wireless communication device in accordance with such embodiments may not be aware of the call drop and does not have to take action to proactively reestablish the voice call following network transition in accordance with such example embodiments. User experience can accordingly be improved in accordance with some example embodiments, as users may experience fewer outright call drops from the user perspective and voice calls can be automatically reestablished in the background subsequent to a network transition, even in networks that do not support SRVCC or other technique for transitioning a voice call between cellular RATs.

In a first embodiment, a method for resuming a voice call on a legacy cellular network is provided. The method of the first embodiment can include a wireless communication device establishing a voice call with a remote device over a connection between the wireless communication device and an LTE network. The voice call can be serviced as a VoLTE call on the LTE network. The method of the first embodiment can further include the wireless communication device determining that a connection quality of the LTE network has dropped below a threshold connection quality; sending a notification that the wireless communication device is releasing the voice call to transition to a legacy cellular network and will resume the voice call on the legacy cellular network; releasing the voice call on the LTE network; providing an indication via a user interface of the wireless communication device that the voice call is ongoing during a period between releasing the voice call on the LTE network and establishing a second voice call with the remote device on the legacy cellular network; and transitioning to the legacy cellular network in response to the connection quality of the LTE network dropping below the threshold connection quality. The legacy cellular network can have a circuit switched domain for supporting voice calls. The method of the first embodiment can additionally include the wireless communication device establishing the second voice call with the remote device on the legacy cellular network; and using the second voice call to resume the voice call with the remote device.

In a second embodiment, another method for resuming a voice call on a legacy network is provided. The method of the second embodiment can include a wireless communication device establishing a voice call with a remote device over a first cellular network. The voice call can be serviced via a packet switched domain of the first cellular network. The method of the second embodiment can further include the wireless communication device determining that a connection quality of the first cellular network has dropped below a threshold connection quality; sending a notification that the wireless communication device is releasing the voice call to transition to a legacy cellular network and will resume the voice call on the legacy cellular network; releasing the voice call on the first cellular network; transitioning to the legacy cellular network; and establishing a second voice call with the remote device on the legacy cellular network. The second voice call can be serviced via a circuit switched domain of the legacy cellular network. The method of the second embodiment can additionally include the wireless communication device using the second voice call to resume the voice call with the remote device.

In a third embodiment, a wireless communication device is provided. The wireless communication device of the third embodiment can include at least one transceiver and processing circuitry coupled to the at least one transceiver. The at least one transceiver can be configured to transmit data and receive data via a first cellular network and a legacy cellular network. The processing circuitry can be configured to control the wireless communication device of the third embodiment to at least establish a voice call with a remote device over a connection between the wireless communication device and the first cellular network. The voice call can be serviced via a packet switched domain of the first cellular network. The processing circuitry can be further configured to control the wireless communication device of the third embodiment to determine that a connection quality of the first cellular network has dropped below a threshold connection quality; send a notification that the wireless communication device is releasing the voice call to transition to the legacy cellular network and will resume the voice call on the legacy cellular network; release the voice call on the first cellular network; transition to the legacy cellular network in response to the connection quality of the first cellular network dropping below the threshold connection quality; and establish a second voice call with the remote device on the legacy cellular network. The second voice call can be serviced via a circuit switched domain of the legacy cellular network. The processing circuitry can be additionally configured to control the wireless communication device of the third embodiment to use the second voice call to resume the voice call with the remote device.

In a fourth embodiment, a computer program product for resuming a voice call on a legacy cellular network is provided. The computer program product of the fourth embodiment can include at least one non-transitory computer readable storage medium having program code stored thereon. The program code of the fourth embodiment can include program code for establishing a voice call with a remote device over a connection between the wireless communication device and a first cellular network. The voice call can be serviced via a packet switched domain of the first cellular network. The program code of the fourth embodiment can further include program code for determining that a connection quality of the first cellular network has dropped below a threshold connection quality; program code for sending a notification that the wireless communication device is releasing the voice call to transition to a legacy cellular network and will resume the voice call on the legacy cellular network; program code for releasing the voice call on the first cellular network; program code for transitioning to the legacy cellular network in response to the connection quality of the first cellular network dropping below the threshold connection quality; and program code for establishing a second voice call with the remote device on the legacy cellular network. The second voice call can be serviced via a circuit switched domain of the legacy cellular network. The program code of the fourth embodiment can additionally include program code for using the second voice call to resume the voice call with the remote device.

In a fifth embodiment, a method for resuming a voice call following transition of a remote wireless communication device from a first cellular network to a legacy cellular network is provided. The method of the fifth embodiment can include a communication device establishing a voice call with the remote wireless communication device; receiving a notification that the remote wireless communication device is releasing the voice call to transition from a first cellular network to a legacy cellular network and will resume the voice call on the legacy cellular network; releasing the voice call in response to receipt of the notification; providing an indication via a user interface of the communication device that the voice call is ongoing during a period between releasing the voice call and receiving a second voice call from the remote wireless communication device after the remote wireless communication device has transitioned to the legacy cellular network; receiving the second voice call from the remote wireless communication device after the remote wireless communication device has transitioned to the legacy cellular network; and using the second voice call to resume the voice call with the remote wireless communication device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Figure 1:
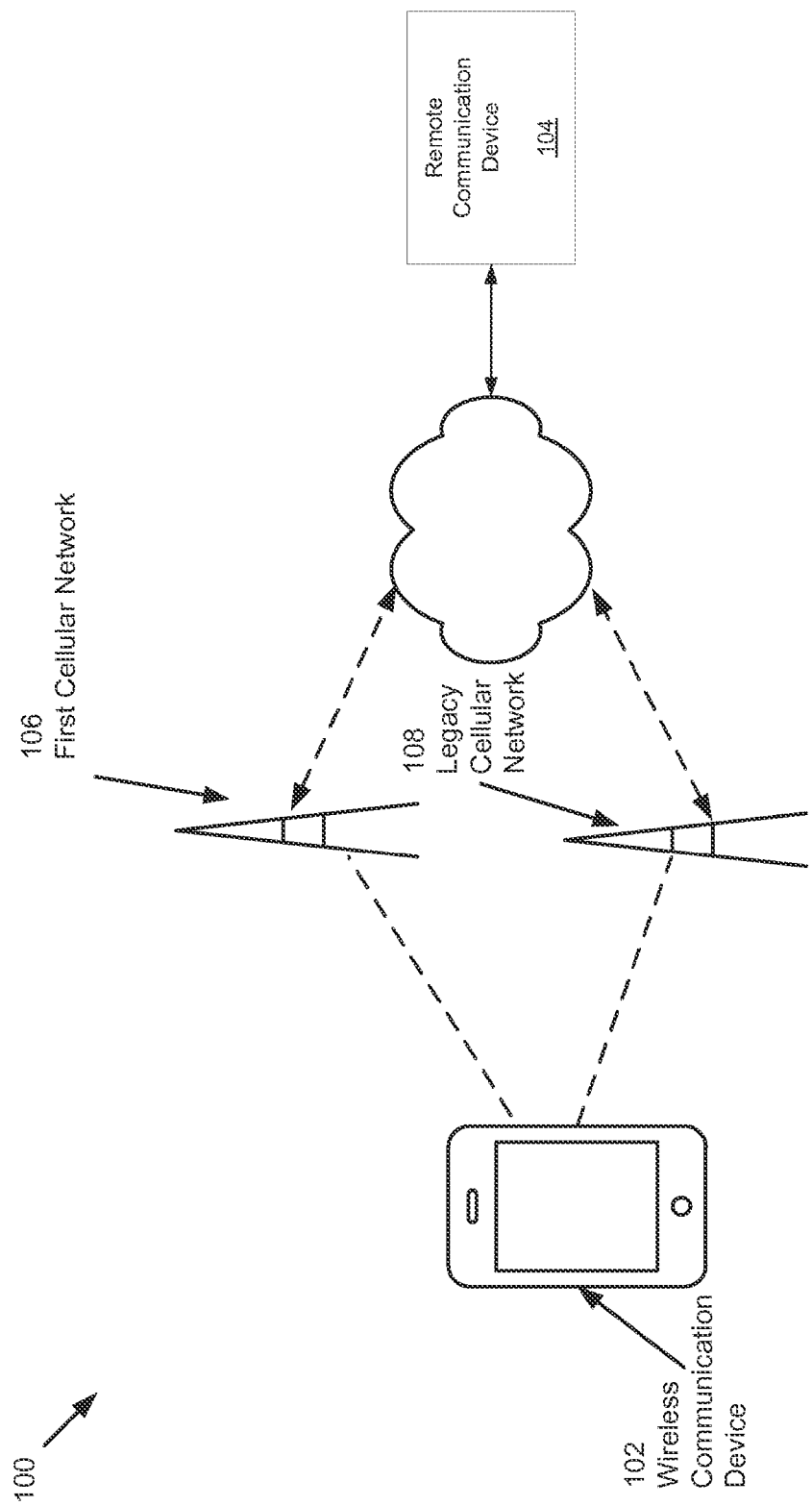
FIG. 1 illustrates a wireless communication system in accordance with some example embodiments.

Representative applications of the systems, methods, apparatuses, and computer program products disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein facilitate resumption of a voice call on a legacy network. In this regard, some example embodiments provide a wireless communication device configured to proactively release a voice call on a first cellular network and reestablish the voice call on a legacy cellular network after transitioning to the legacy cellular network due to a connection quality of the first cellular network. In some example embodiments, reestablishment of the voice call can be coordinated between the wireless communication device and another device participating in the call and can be automatically handled in the background such that users participating in the voice call do not have to manually expend effort to reestablish the voice call. In this regard, in some example embodiments, when a wireless communication device is exiting the coverage of a first cellular network, the device can gracefully exit the voice call over the first cellular network and can reestablish the voice call over a legacy cellular network without an end user being aware of the voice call being dropped or that a new voice call has been established. Accordingly, while a user may notice a relatively brief interruption in audio transmission for the voice call, the user may not be aware of the call drop and does not have to take action to proactively reestablish the voice call following network transition in accordance with such example embodiments. User experience can accordingly be improved in accordance with some example embodiments, as users may experience fewer outright call drops from the user perspective and voice calls can be automatically reestablished in the background subsequent to a network transition, even in networks that do not support SRVCC or other technique for transitioning a voice call between cellular RATs.

FIG. 1 illustrates an example wireless communication system 100 in accordance with some example embodiments. The system 100 can include a wireless communication device 102, which can establish a voice call with a remote communication device 104. The voice call can be initiated by either the wireless communication device 102 or the remote communication device 104. By way of non-limiting example, the wireless communication device 102 can be a cellular phone, such as a smart phone device, a tablet computing device, a laptop computing device, or other computing device that can be configured to operate in accordance with multiple cellular RATs. In some example embodiments, the wireless communication device 102 can be configured to connect to both a first cellular network 106 and a legacy cellular network 108.

The remote communication device 104 can be embodied as any device that can be configured to engage in a video call over a network connection, including, for example, a video phone, a cellular phone, a tablet computing device, a laptop computing device, a desktop computer, or other computing device. In some example embodiments, the remote communication device 104 can be embodied as a second wireless communication device 102.

The first cellular network 106 can, for example, be a network that can be configured to support servicing of a voice call via a packet switched (PS) domain. For example, the first cellular network can be configured to service a voice call via voice over Internet Protocol (VoIP) transmission of PS audio data for the voice call. As a non-limiting example, the first cellular network 106 can be a network implementing an LTE RAT, such as LTE, LTE-Advanced (LTE-A), and/or the like, which can support voice over LTE (VoLTE) transmission of audio data for a voice call. In some example embodiments, such as some example embodiments in which the first cellular network 106 implements an LTE RAT, the first network 106 can include an Internet Protocol Multimedia Subsystem (IMS), which can support servicing of a voice call. In some embodiments, the first cellular network 106 may not support SRVCC or other technique for transitioning a voice call to a legacy network having a circuit switched domain.

The legacy cellular network 108 can be any network having a circuit switched (CS) domain for servicing voice calls. By way of non-limiting example, the legacy cellular network 108 can be a third generation (3G) network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy cellular network 108 can be a CDMA2000 network, such as a 1xRTT network, or other network standardized by the Third Generation Partnership Project 2 (3GPP2) that supports a CS domain. As another example, the legacy cellular network 108 can be a second generation (2G) network such as a Global System for Mobile Communications (GSM) network.

As will be described further herein below, the wireless communication device 102 and remote communication device 104 can have an established voice call serviced via a connection between the wireless communication device 102 and the first cellular network 106. A connection quality of the connection between the wireless communication device 102 and the first cellular network 106 can degrade, such as due to mobility of the wireless communication device 102. As a result of the degradation in connection quality, the wireless communication device 102 can transition to the legacy cellular network 108. In accordance with some example embodiments described further herein below, a new voice call session can be established on the legacy cellular network 108 so that the voice call can be resumed after the wireless communication device 102 has transitioned to the legacy cellular network 108.

Figure 2:
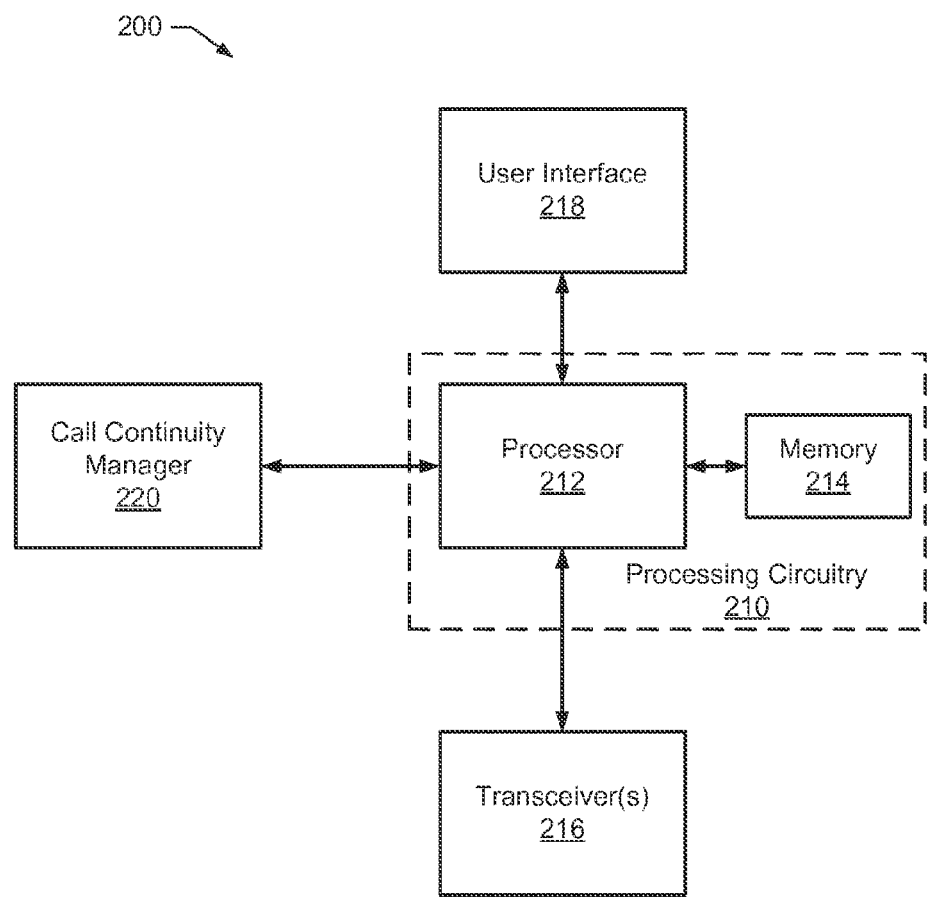
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 and/or on a remote communication device 104 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices, or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a cellular chipset configured to enable a computing device to operate over the first cellular network 106 and/or legacy cellular network 108.

In some example embodiments, the processing circuitry 210 can include a processor 212 and, in some embodiments, such as that illustrated in FIG. 2, can further include memory 214. The processing circuitry 210 can be in communication with or otherwise control a transceiver(s) 216, user interface 218, and/or call continuity manager 220.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, user interface 218, or call continuity manager 220 via a bus(es) for passing information among components of the apparatus 200.

The apparatus 200 can further include transceiver(s) 216. The transceiver(s) 216 can enable the apparatus 200 to send wireless signals to and receive signals from one or more cellular networks, such as the first cellular network 106 and/or the legacy cellular network 108. As such, the transceiver(s) 216 can be configured to support any type of cellular or other wireless communication technology that may be implemented by the first cellular network 106 and/or the legacy cellular network 108. In some example embodiments, the transceiver(s) 216 can include a single transceiver configured to enable a device, such as the wireless communication device 102, to connect to both the first cellular network 106 and the legacy cellular network 108. Alternatively, in some example embodiments, the transceiver(s) 216 can include a first transceiver configured to enable a device, such as the wireless communication device 102, to connect to the first cellular network 106 and a second transceiver configured to enable the device to connect to the legacy cellular network 108.

The apparatus 200 can additionally include a user interface 218. The user interface 218 can be in communication with the processor 212 to receive an indication of a user input and/or to provide an audible, visual, mechanical, or other output to a user. As such, the user interface 218 may include, for example, a keyboard, a mouse, a joystick, a display, a touch screen display, a microphone, a speaker, a camera, and/or other input/output mechanisms. For example, the user interface 218 can include a display on which call status information for a voice call can be displayed.

The apparatus 200 can further include a call continuity manager 220. The call continuity manager 220 can be embodied as various means, such as circuitry, hardware, a computer program product including a computer readable medium (for example, the memory 214) storing computer readable program instructions that are executable by a processing device (for example, the processor 212), or some combination thereof. In some embodiments, the processor 212 (or the processing circuitry 210) can include, or otherwise control the call continuity manager 220. The call continuity manager 220 can be configured to manage or otherwise support transitioning a voice call between networks in accordance with one or more example embodiments.

Figure 3:
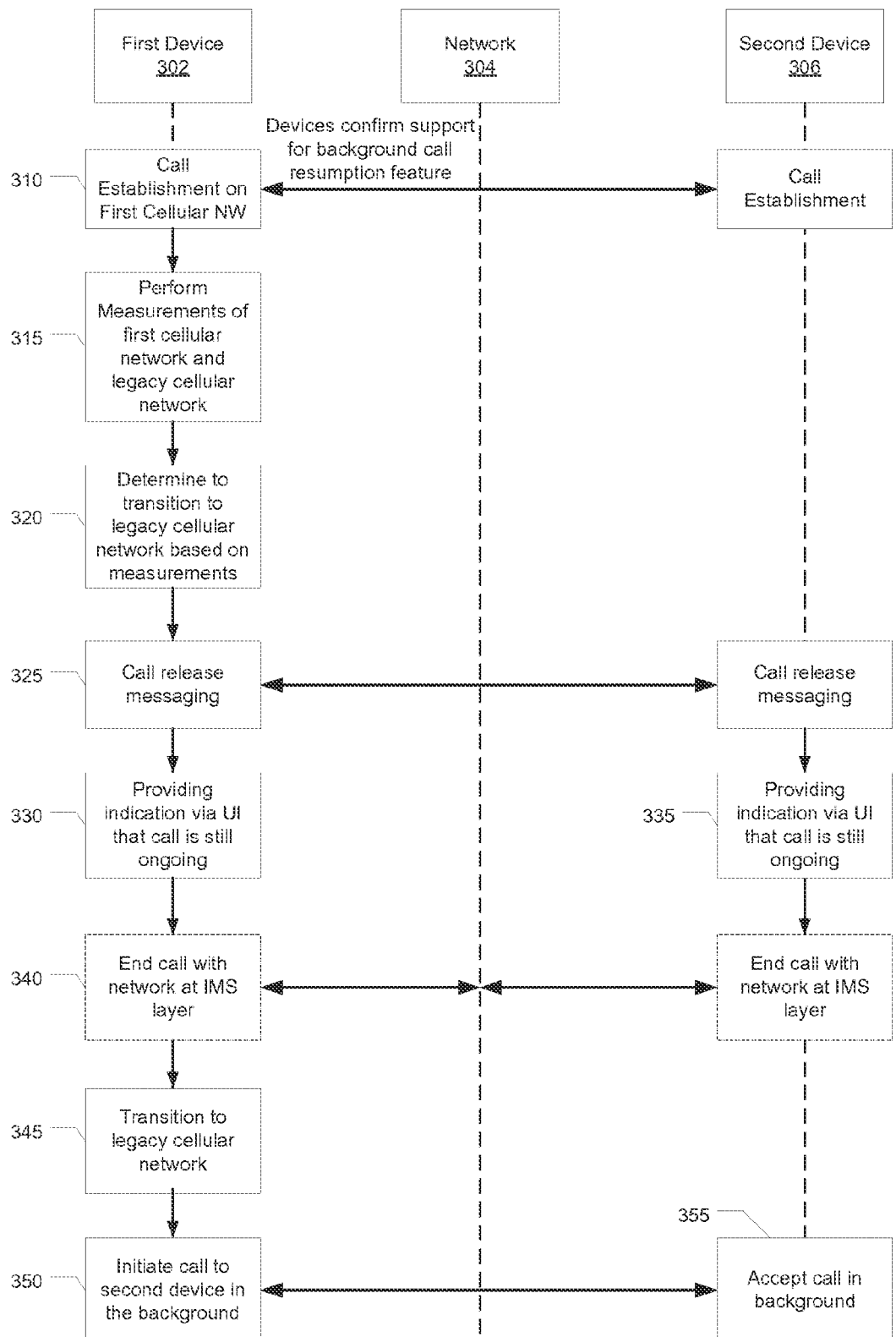
FIG. 3 illustrates a signaling diagram according to an example method for resuming a voice call in accordance with some example embodiments.

FIG. 3 illustrates a signaling diagram according to an example method for resuming a voice call in accordance with some example embodiments. In this regard, FIG. 3 illustrates operations that can be performed by and signals that can be exchanged between a first device 302, network 304, and second device 306 in accordance with some example embodiments. The first device 302 can be an embodiment of the wireless communication device 102, and the second device 306 can be an embodiment of the remote communication device 104. As such, it will be appreciated that one or more of processing circuitry 210, processor 212, memory 214, transceiver(s) 216, user interface 218, or call continuity manager 220 can, for example, provide means for performing the operations of the first device 302 and/or of the second device 306 in accordance with some example embodiments.

The network 304 can include one or more networks and/or elements of one or more networks, which can be configured to support a voice call between the first device 302 and second device 306. For example, the network 304 can include one or more elements of a radio access network (RAN) for the first cellular network 106 and/or one or more elements of a RAN for the legacy cellular network 108. In embodiments in which the second device 306 is connected to a cellular network for supporting a voice call with the wireless communication device 102, the network 304 can further include one or more elements of a RAN to which the second device 306 can be connected. The network 304 can additionally include one or more elements of a core network, which can be interfaced with one or more cellular RANs.

Operation 310 can include the first device 302 and second device 306 establishing a voice call. The voice call can be established while the first device 302 is connected to the first cellular network 106. The voice call can be initiated by either the first device 302 or second device 306. In some example embodiments, the call establishment phase can include the first device 302 and second device 306 confirming that they each support a background call resumption feature in accordance with one or more example embodiments. For example, the confirmation can be provided through signaling attendant to negotiation or establishment of parameters for the voice call session, such as in a session initiation protocol (SIP) INVITE message, capabilities message, and/or the like that can be exchanged between the first device 302 and second device 306.

The voice call can be serviced via a PS domain of the first cellular network 106. In some example embodiments in which the first cellular network 106 implements an LTE RAT, the voice call can be a VoLTE call from the perspective of the first device 302. In some example embodiments in which the second device 306 is connected to a RAN implementing an LTE RAT, the voice call can be provided via an end-to-end VoLTE connection.

Operation 315 can include the first device 302 performing measurements of the first cellular network 106 and/or of the legacy cellular network 108 while engaged in the voice call with the second device 306. The measurements can, for example, be performed in accordance with a radio resource control (RRC) configuration that can be provided to the first device 302 by the first cellular network 106. Operation 315 can include measurement of any of a variety of channel qualities of the first cellular network 106 and/or of the legacy cellular network 108. For example, the first device 302 can perform radio frequency (RF) measurements of the first cellular network 106 and/or of the legacy cellular network 108, such as reference signal received quality (RSRQ) measurements, reference signal received power (RSRP) measurements, received signal strength indicator (RSSI) measurements, received signal code power (RSCP) measurements, and/or the like. As a further example, operation 315 can additionally or alternatively include the first device 302 determining a loading on a serving cell of the first cellular network 106, a realized throughput on the first cellular network 106, a level of congestion on the first cellular network 106, and/or other channel condition on the first cellular network 106.

Operation 320 can include the first device 302 determining to transition to the legacy cellular network 108 based on the measurements of operation 315. For example, the first device 302 can determine that a measured RF condition of the first cellular network 106 is below a threshold that can be indicative of the first device 302 exiting an area of coverage of the first cellular network 106. The threshold can, for example, be a network configured threshold, or can be a threshold that can be self-defined by the first device 302. For example, in some example embodiments in which the first cellular network 106 implements an LTE RAT, operation 320 can include determining to transition to the legacy cellular network in response to an A2 measurement threshold being satisfied. Operation 320 can additionally or alternatively include determining that a measured RF condition of the legacy cellular network 108 is sufficient to satisfy a threshold indicating that RF coverage of the legacy cellular network 108 is good enough to provide a better channel quality than the first cellular network 106.

As a further example, operation 320 can additionally or alternatively include the first device 302 determining a loading on a serving cell of the first cellular network 106 exceeds a threshold, determining that a realized throughput on the first cellular network 106 fails to satisfy a threshold, determining that a level of congestion on the first cellular network 106 exceeds a threshold, and/or the like.

Operation 325 can include the first device 302 and second device 306 exchanging call release messaging. In this regard, operation 325 can include the first device 302 sending a notification to the second device 306 indicating that the first device 302 is releasing the voice call to transition to the legacy cellular network 108 and will resume the voice call on the legacy cellular network 108 in accordance with a background call resumption feature that can be supported by the first device 302 and second device 306. For example, in some embodiments, operation 325 can include the first device 302 sending IMS SIP signaling to the second device 306 indicating that the first device 302 is releasing the voice call to transition to the legacy cellular network 108 and will resume the voice call on the legacy cellular network 108. As another example, in some embodiments, operation 325 can include the first device 302 sending a real-time transport protocol (RTP) packet, such as an RTP packet that can be used to convey data in support of an audio stream for the voice call, to the second device 306 including an indication that the first device 302 is releasing the voice call to transition to the legacy cellular network 108 and will resume the voice call on the legacy cellular network 108. For example, in some embodiments, one or more reserved bits in a codec mode request (CMR) field of an RTP packet can be used by the first device 302 to inform the second device 306 that the first device 302 is releasing the voice call to transition to the legacy cellular network 108 and will resume the voice call on the legacy cellular network 108.

In some example embodiments, operation 325 can additionally include the second device 306 sending a response to the first device 302 acknowledging the intention of the first device 302 to release the voice call to transition to the legacy cellular network 108 and to resume the voice call on the legacy cellular network 108. For example, in some embodiments, the second device 306 can send a SIP 200 OK message or other acknowledgement to the first device 302.

After informing the second device 306 of its intention to release the voice call to transition to the legacy cellular network 108 (and optionally after receiving an acknowledgement from the second device 306 in some example embodiments), the first device 302 can release the voice call, such as by sending a SIP BYE message to the second device 306. The second device 306 can, for example, respond to the SIP BYE message with a SIP 200 OK message.

When the call has been released, the first device 302 can continue to provide an indication via the device user interface (e.g., via user interface 218) that the voice call is still ongoing, as illustrated by operation 330. For example, a call status, such as a call timer and/or other call status indicator, can be displayed on a device display to indicate that the call is ongoing during the period between release of the voice call and reestablishing the voice call after transitioning to the legacy cellular network 108. As another example, an audible indication, such as music, a tone, and/or the like, can be played out via a device speaker during the voice interruption that can occur between release of the voice call and reestablishing the voice call after transitioning to the legacy cellular network 108. Operation 335 can include the second device 306 similarly providing indication via a device user interface that the voice call is still ongoing. Accordingly, users of the first device 302 and second device 306 can be under the impression that the voice call is still ongoing and has not been dropped. In some example embodiments, however, if an interruption to the voice call during the period between release of the voice call and reestablishing the voice call exceeds a threshold, a call status indication can be provided that an automatic redial process is under way attendant to performance of operation 330 and/or of operation 335.

Some example embodiments can optionally include operation 340, which can include the first device 302 and/or second device 306 ending the call with the network 304 at the IMS layer. In embodiments including operation 340, termination of the call at the IMS layer can lead to the impression from the network perspective that the call has been normally terminated rather than being dropped. However, it will be appreciated that in some example embodiments, operation 340 can be omitted by one or both of the first device 302 and second device 306 and the network 304 may be under the impression that the voice call has been dropped or otherwise abnormally terminated.

Operation 345 can include the first device 302 transitioning to the legacy cellular network 108. In some example embodiments, performance of operation 345 can include the first device 302 performing a registration procedure and/or other procedures that can be performed attendant to establishing a connection with a network.

Operation 350 can include the first device 302 initiating a call to the second device 306 in the background after transitioning to the legacy cellular network 108. In some example embodiments, operation 350 can be performed as quickly as possible upon transition to the legacy cellular network 108 (e.g., following registration to the legacy cellular network 108) so as to limit an interruption time for the voice call. Operation 350 can be performed automatically without requiring any user input to reestablish the voice call. In this regard, initiating the call can be transparent to the user interface of the first device 302, as the user can be unaware that the call was ever released as a result of the indication that can be provided in operation 330 until the call has been successfully reestablished after transitioning to the legacy cellular network 108.

Operation 355 can include the second device 306 accepting the call in the background. The user of the second device 306 can be unaware that a new call from the first device 302 has been received and the call can be accepted automatically in the background without user input. In this regard, the user interface of the second device 306 can continue to indicate attendant to performance of operation 335 that the call is ongoing during the period during which the first device 302 is transitioning to the legacy cellular network and reestablishing the voice call.

The new call established in operations 350 and 355 can accordingly be used by the first device 302 and second device 306 to resume the voice call. The new call can be serviced on the first device 302 end of the call via a circuit switched domain of the legacy cellular network 108.

Figure 4:
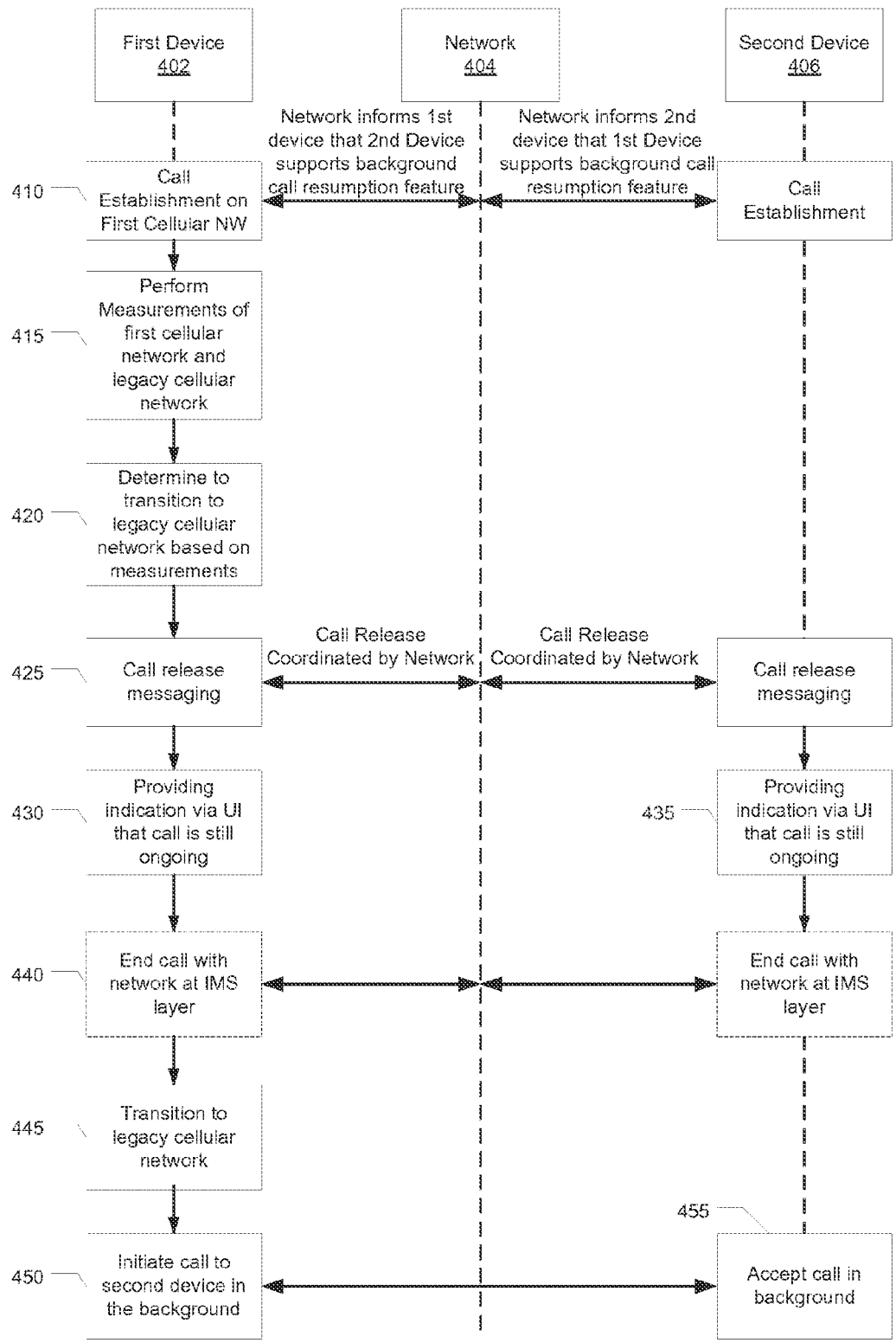
FIG. 4 illustrates a signaling diagram according to another example method for resuming a voice call in accordance with some example embodiments.

FIG. 4 illustrates a signaling diagram according to another example method for resuming a voice call in accordance with some example embodiments. In this regard, FIG. 4 illustrates an example method in which the network can play a more proactive role in facilitating voice call resumption than in the method illustrated in and described with respect to FIG. 3. FIG. 4 illustrates operations that can be performed by and signals that can be exchanged between a first device 402, network 404, and second device 406 in accordance with some example embodiments. The first device 402 can be an embodiment of the wireless communication device 102, and the second device 406 can be an embodiment of the remote communication device 104. As such, it will be appreciated that one or more of processing circuitry 210, processor 212, memory 214, transceiver(s) 216, user interface 218, or call continuity manager 220 can, for example, provide means for performing the operations of the first device 402 and/or of the second device 406 in accordance with some example embodiments.

The network 404 can include one or more networks and/or elements of one or more networks, which can be configured to support a voice call between the first device 402 and second device 406. For example, the network 304 can include one or more elements of a RAN for the first cellular network 106 and/or one or more elements of a RAN for the legacy cellular network 108. In embodiments in which the second device 406 is connected to a cellular network for supporting a voice call with the wireless communication device 102, the network 404 can further include one or more elements of a RAN to which the second device 406 can be connected. The network 404 can additionally include one or more elements of a core network, which can be interfaced with one or more cellular RANs.

Operation 410 can include the first device 402 and second device 406 establishing a voice call. The voice call can be established while the first device 402 is connected to the first cellular network 106. The voice call can be initiated by either the first device 402 or second device 406. In the example illustrated in FIG. 4, the network 404 can inform the first device 402 that the second device 406 supports a background call resumption feature in accordance with one or more example embodiments. The network 404 can likewise inform the second device 406 that the first device 402 supports the background call resumption feature. For example, the network 404 can be aware of capabilities of the first device 402 and the second device 406 and can configure one or more of the first device 402 or the second device 406 for usage of the background call resumption feature during call establishment phase. Additionally or alternatively, the first device 402 and/or the second device 406 can inform the network 404 that it supports the background call resumption feature during call establishment and the network 404 can pass along the information to the opposite device so that both the first device 402 and second device 406 will know that the devices party to the call support the background call resumption feature and that the feature may be triggered during the voice call. In this regard, rather than signaling between the first device 402 and second device 406 being used to confirm support for the background call resumption feature as in operation 310 of the example of FIG. 3, the network 404 can serve as an intermediary that can inform the first device 402 and the second device 406 of the opposite device's capabilities during call establishment.

The voice call can be serviced via a PS domain of the first cellular network 106. In some example embodiments in which the first cellular network 106 implements an LTE RAT, the voice call can be a VoLTE call from the perspective of the first device 302. In some example embodiments in which the second device 406 is connected to a RAN implementing an LTE RAT, the voice call can be provided via an end-to-end VoLTE connection.

Operation 415 can include the first device 402 performing measurements of the first cellular network 106 and/or of the legacy cellular network 108 while engaged in the voice call with the second device 406. The measurements can, for example, be performed in accordance with an RRC configuration that can be provided to the first device 402 by the first cellular network 106. Operation 415 can include measurement of any of a variety of channel qualities of the first cellular network 106 and/or of the legacy cellular network 108. For example, the first device 402 can perform RF measurements of the first cellular network 106 and/or of the legacy cellular network 108, such as RSRQ measurements, RSRP measurements, RSSI measurements RSCP measurements, and/or the like. As a further example, operation 415 can additionally or alternatively include the first device 402 determining a loading on a serving cell of the first cellular network 106, a realized throughput on the first cellular network 106, a level of congestion on the first cellular network 106, and/or other channel condition on the first cellular network 106.

Operation 420 can include the first device 402 determining to transition to the legacy cellular network 108 based on measurements of operation 415. For example, the first device 402 can determine that a measured RF condition of the first cellular network 106 is below a threshold that can be indicative of the first device 402 exiting an area of coverage of the first cellular network 106. The threshold can, for example, be a network configured threshold, or can be a threshold that can be self-defined by the first device 402. For example, in some example embodiments in which the first cellular network 106 implements an LTE RAT, operation 420 can include determining to transition to the legacy cellular network in response to an A2 measurement threshold being satisfied. Operation 420 can additionally or alternatively include determining that a measured RF condition of the legacy cellular network 108 is sufficient to satisfy a threshold indicating that RF coverage of the legacy cellular network 108 is good enough to provide a better channel quality than the first cellular network 106. In this regard, the wireless communication device 102 of some example embodiments can, for example, measure an RF condition of the legacy cellular network 108 and/or one or more further networks or RATs other than a RAT used by the first cellular network 106 in response to a signal quality of the first cellular network 106 dropping in an instance in which no alternative cells for the first cellular network 106 having an acceptable signal quality have been found.

As a further example, operation 420 can additionally or alternatively include the first device 402 determining a loading on a serving cell of the first cellular network 106 exceeds a threshold, determining that a realized throughput on the first cellular network 106 fails to satisfy a threshold, determining that a level of congestion on the first cellular network 106 exceeds a threshold, and/or the like.

Operation 425 can include the first device 302 and second device 306 exchanging call release messaging. In the example of FIG. 4, the call release can be coordinated by the network 404. For example, the first device 402 can send signaling to the serving network (e.g., the first cellular network 106) indicating that the first device 402 is releasing the voice call to transition to the legacy cellular network 108 and will resume the voice call on the legacy cellular network 108. The network 404 can in turn inform the second device 406 that the first device 402 is releasing the voice call to transition to the legacy cellular network 108 and will resume the voice call on the legacy cellular network 108 so that the second device 406 is aware of the intent of the first device 402. In some example embodiments, IMS SIP signaling between the first device 402 and network 404, as well as between the network 404 and second device 406 can be used to coordinate call release. It will be appreciated that other signaling protocols and techniques are contemplated within the scope of the disclosure.

In some example embodiments, operation 425 can include the second device 406 sending a response to the network 404 and/or to the first device 402 acknowledging the intention of the first device 302 to release the voice call to transition to the legacy cellular network 108 and to resume the voice call on the legacy cellular network 108. For example, in some embodiments, the second device 306 can send a SIP 200 OK message or other acknowledgement to the network 404 and/or to the first device 402.

After informing the network 404 of its intention to release the voice call to transition to the legacy cellular network 108 (and optionally after receiving an acknowledgement from the network 404 and/or from the second device 406 in some example embodiments), the first device 402 can release the voice call, such as by sending a SIP BYE message to the network 404 and/or to the second device 406. The network 404 and/or second device 406 can, for example, respond to the SIP BYE message with a SIP 200 OK message.

When the call has been released, the first device 402 can continue to provide an indication via the device user interface (e.g., via user interface 218) that the voice call is still ongoing, as illustrated by operation 430. For example, a call status, such as a call timer and/or other call status indicator, can be displayed on a device display to indicate that the call is ongoing during the period between release of the voice call and reestablishing the voice call after transitioning to the legacy cellular network 108. As another example, an audible indication, such as music, a tone, and/or the like, can be played out via a device speaker during the voice interruption that can occur between release of the voice call and reestablishing the voice call after transitioning to the legacy cellular network 108. Operation 435 can include the second device 306 similarly providing indication via a device user interface that the voice call is still ongoing. Accordingly, users of the first device 402 and second device 406 can be under the impression that the voice call is still ongoing and has not been dropped. In some example embodiments, however, if an interruption to the voice call during the period between release of the voice call and reestablishing the voice call exceeds a threshold, a call status indication can be provided that an automatic redial process is under way attendant to performance of operation 430 and/or of operation 435.

Some example embodiments can optionally include operation 440, which can include the first device 402 and/or second device 406 ending the call with the network 404 at the IMS layer. In embodiments including operation 440, termination of the call at the IMS layer can lead to the impression from the network perspective that the call has been normally terminated rather than being dropped. However, it will be appreciated that in some example embodiments, operation 440 can be omitted by one or both of the first device 402 and second device 406.

Operation 445 can include the first device 402 transitioning to the legacy cellular network 108. In some example embodiments, performance of operation 445 can include the first device 402 performing a registration procedure and/or other procedures that can be performed attendant to establishing a connection with a network.

Operation 450 can include the first device 402 initiating a call to the second device 406 in the background after transitioning to the legacy cellular network 108. In some example embodiments, operation 450 can be performed as quickly as possible upon transition to the legacy cellular network 108 (e.g., following registration to the legacy cellular network 108) so as to limit an interruption time for the voice call. Operation 450 can be performed automatically without requiring any user input to reestablish the voice call. In this regard, initiating the call can be transparent to the user interface of the first device 402, as the user can be unaware that the call was ever released as a result of the indication that can be provided in operation 430 until the call has been successfully reestablished after transitioning to the legacy cellular network 108.

Operation 455 can include the second device 406 accepting the call in the background. The user of the second device 406 can be unaware that a new call from the first device 402 has been received and the call can be accepted automatically in the background without user input. In this regard, the user interface of the second device 406 can continue to indicate attendant to performance of operation 435 that the call is ongoing during the period during which the first device 402 is transitioning to the legacy cellular network and reestablishing the voice call.

The new call established in operations 450 and 455 can accordingly be used by the first device 402 and the second device 406 to resume the voice call. The new call can be serviced on the first device 402 end of the call via a circuit switched domain of the legacy cellular network 108.

Figure 5:
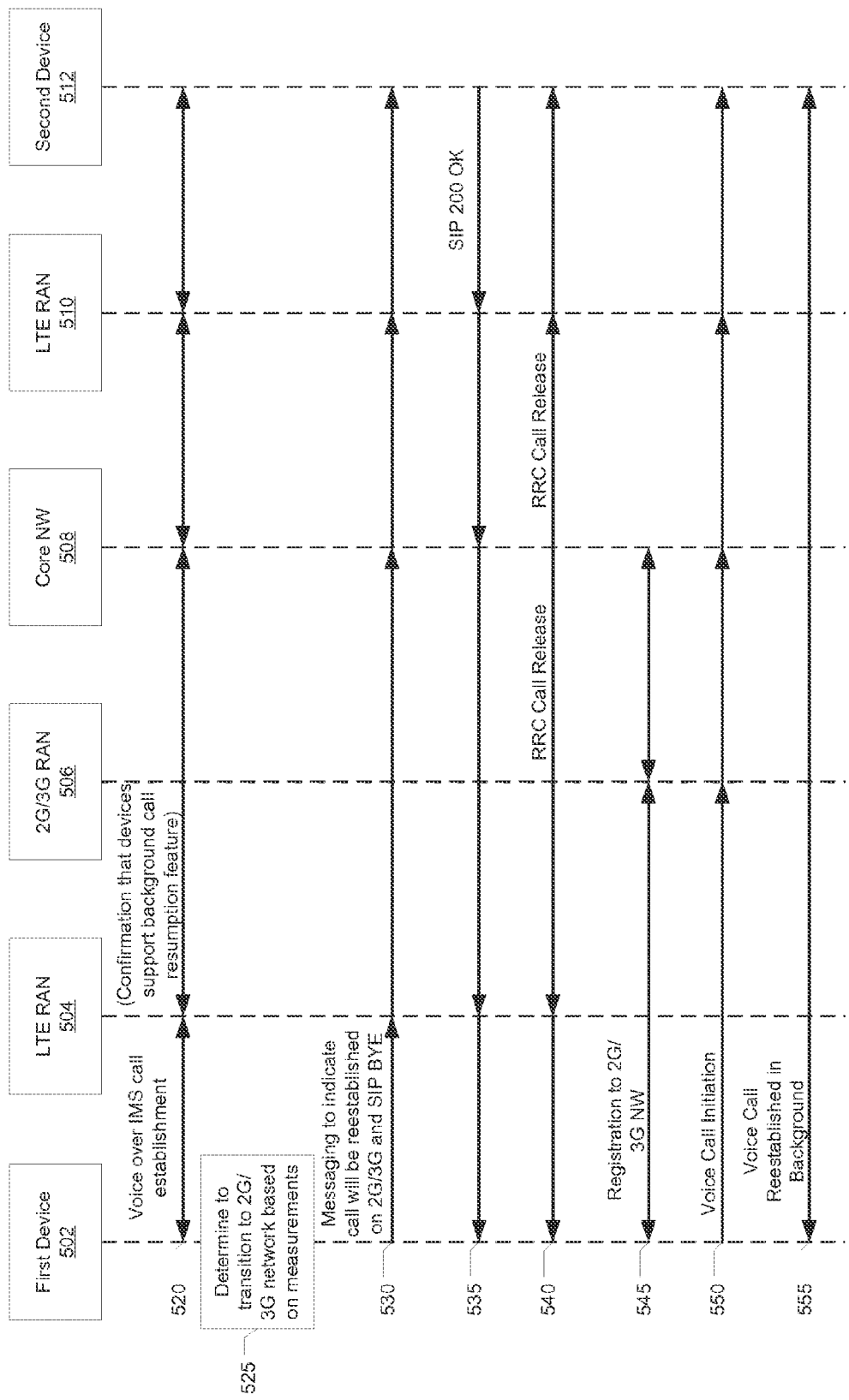
FIG. 5 illustrates a signaling diagram according to a further example method for resuming a voice call in accordance with some example embodiments.

FIG. 5 illustrates a signaling diagram according to a further example method for resuming a voice call between a first device 502 and a second device 512 in accordance with some example embodiments. In this regard, FIG. 5 illustrates signaling according to an example in which the first cellular network 106 implements an LTE RAT, represented by the LTE RAN 504 and the legacy cellular network 108 implements a 2G or a 3G RAT, represented by the 2G/3G RAN 506. The first device 502 can be an embodiment of the wireless communication device 102, which can transition from the LTE RAN 504 to the 2G/3G RAN 506. The second device 512 can be an embodiment of the remote communication device 104. In the example of FIG. 5, the second device 512 can be connected to an LTE RAN 510. One or more of processing circuitry 210, processor 212, memory 214, transceiver(s) 216, user interface 218, or call continuity manager 220 can, for example, provide means for performing the operations of the first device 502 and/or of the second device 512 in accordance with some example embodiments.

Operation 520 can include the first device 502 and the second device 512 establishing a voice call. The voice call can be established via IMS, and can be an end-to-end VoLTE call, with the first device 502 being connected to the LTE RAN 504. During call establishment, the first device 502 and the second device 512 can each confirm that the other supports the background call resumption feature. In some example embodiments, this confirmation can be handled via signaling between the first device 502 and second device 512, such as in the embodiment described with respect to operation 310 in the example of FIG. 3. Alternatively, in some example embodiments, this confirmation can be based on network centric coordination in which the network (e.g., the core network 508) can inform each of the first device 502 and the second device 512 that the other supports the background call resumption feature, such as in the embodiment described with respect to operation 410 in the example of FIG. 4.

Operation 525 can include the first device 502 determining to transition to the 2G/3G RAN 506 based at least in part on measurements of the LTE RAN 504 and/or of the 2G/3G RAN 506 that can be captured by the first device 502 during the voice call. The first device 502 can, for example, measure the 2G/3G RAN 506 in response to a signal quality of the LTE RAN 504 dropping in an instance in which no alternative LTE cell with an acceptable signal quality is identified. Operation 530 can include the first device 502 sending a notification indicating that the first device 502 is releasing the voice call to transition to the 2G/3G RAN 506 and will resume the voice call on the 2G/3G RAN 506. The notification can, for example, be sent via IMS SIP signaling. As another example, the notification can be included in an RTP packet payload, such as in one or more reserved bits of a CMR field of an RTP packet.

In some example embodiments, the notification can be sent to the second device 512 by the first device 502, such as in the example embodiment described with respect to operation 325 in the example of FIG. 3. In such example embodiments, the messaging can be forwarded from the LTE RAN 504 to the core network 508, from the core network 508 to the LTE RAN 510, and from the LTE RAN 510 to the second device 512. Alternatively, in some example embodiments, operation 530 can include the first device 502 sending the notification to the core network 508, which can, in turn, inform the second device 512 that the first device 502 is releasing the voice call to transition to the 2G/3G RAN 506 and will resume the voice call on the 2G/3G RAN 506. This network centric approach can be similar to the embodiment described with respect to operation 425 in the example of FIG. 4, in which the network can coordinate the release of the call.

Operation 530 can additionally include the first device 502 sending a SIP BYE message to the second device 512 to release the call. The second device 512 can send a SIP 200 OK message to the first device 502 in response to the SIP BYE message, as illustrated by operation 535.

At operation 540, the core network 508 can send an RRC call release to both the first device 502 and the second device 512. However, in some example embodiments, the first device 502 can tune away from the LTE RAN 504 and begin transition to the 2G/3G RAN 506 before receiving the RRC call release. In this regard, the first device 502 of some example embodiments can tune away from the LTE RAN 504 after receiving the SIP 200 OK message that can be sent by the second device 512 in operation 535 without waiting to receive an RRC call release from the network.

Operation 545 can include the first device 502 performing registration to the 2G/3G network. The 2G/3G RAN 506 can, in turn, update the registration for the first device 502 to the core network 508.

Operation 550 can include the first device 502 initiating a new voice call to the second device 512 via the connection to the 2G/3G RAN 506. Operation 555 can include the first device 502 and second device 512 reestablishing the voice call in the background. In this regard, initiation of the new call by the first device 502 and reestablishment of the voice call by the first device 502 and second device 512 can be performed in the background, such that the operations are transparent to the respective user interfaces of the first device 502 and the second device 512. The first device 502 and second device 512 can provide indication to the respective device users that the call is ongoing while the first device 502 is transitioning to the 2G/3G RAN 506 and reestablishing the voice call in the background.

Figure 6:
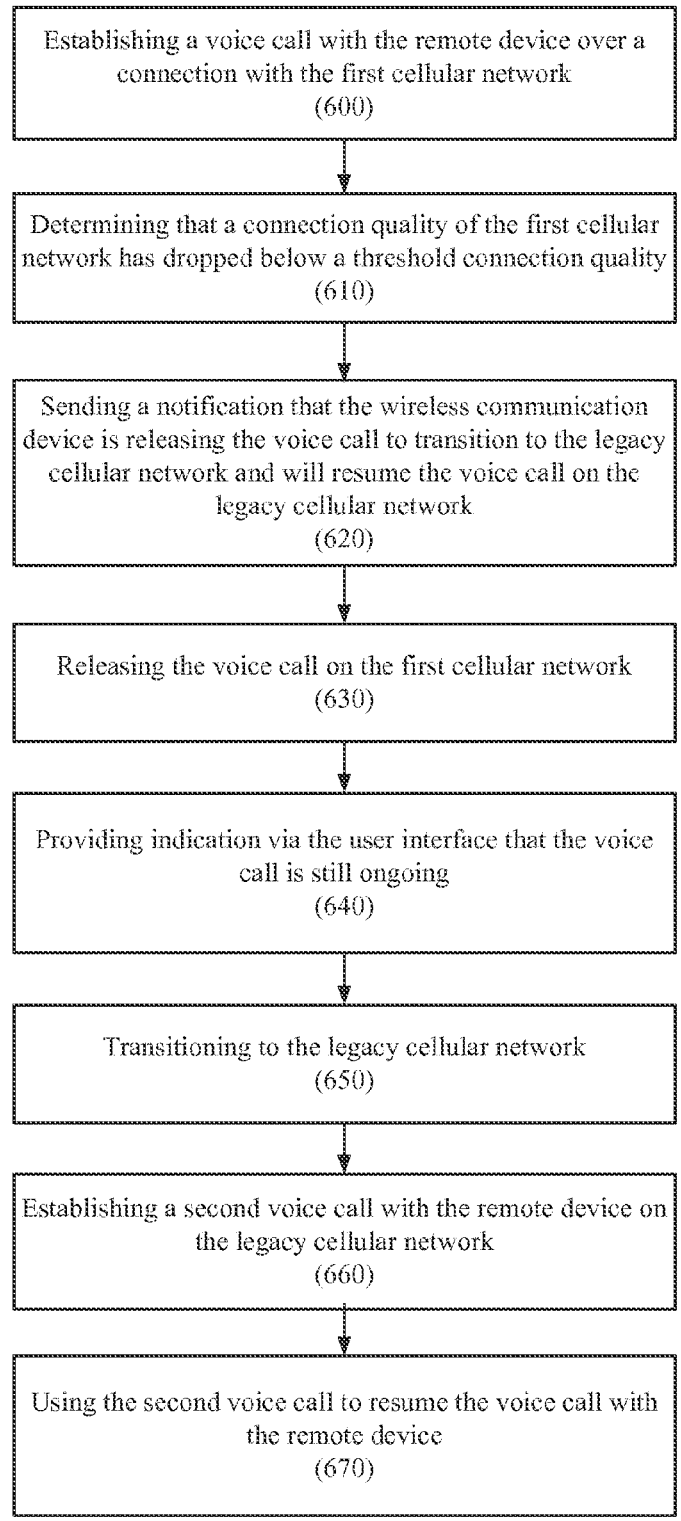
FIG. 6 illustrates a flowchart of operations that can be performed by a wireless communication device in accordance with an example method for resuming a voice call according to some example embodiments.

FIG. 6 illustrates a flowchart of operations that can be performed by a wireless communication device 102 in accordance with an example method for resuming a voice call according to some example embodiments. One or more of processing circuitry 210, processor 212, memory 214, transceiver(s) 216, user interface 218, or call continuity manager 220 can, for example, provide means for performing the operations illustrated in and described with respect to FIG. 6.

Operation 600 can include the wireless communication device 102 establishing a voice call with the remote device 104 over a connection with the first cellular network 106. The voice call can be initiated by either the wireless communication device 102 or the remote device 104. The voice call can be serviced via a PS domain of the first cellular network 106. In some example embodiments, the voice call can be serviced via a VoLTE connection between the wireless communication device 102 and the first cellular network 106. In some example embodiments in which the remote device 104 is connected to an LTE network, the voice call can be an end-to-end VoLTE call. In some example embodiments, operation 600 can include the wireless communication device 102 confirming that the remote device 104 supports a background call resumption feature during the call establishment phase.

Operation 610 can include the wireless communication device 102 determining that a connection quality of the first cellular network 106 has dropped below a threshold connection quality. Operation 610 can be performed based at least in part on measurements of the first cellular network 106 and/or of the legacy cellular network 108 that can be performed by the wireless communication device 102. For example, operation 610 can include determining that a measured RF condition of the first cellular network 106 is below a threshold that can be indicative of the wireless communication device 102 exiting an area of coverage of the first cellular network 106. The threshold can, for example, be a network configured threshold, or can be a threshold that can be self-defined by the wireless communication device 102. For example, in some example embodiments in which the first cellular network 106 implements an LTE RAT, operation 610 can include determining to transition to the legacy cellular network 108 in response to an A2 measurement threshold being satisfied. Operation 610 can additionally or alternatively include determining that a measured RF condition of the legacy cellular network 108 is sufficient to satisfy a threshold indicating that RF coverage of the legacy cellular network 108 is good enough to provide a better channel quality than the first cellular network 106. The wireless communication device 102 can, for example, measure an RF condition of the legacy cellular network 108 and/or one or more further networks or RATs other than the RAT used by the first cellular network 106 in response to a signal quality of the first cellular network 106 dropping in an instance in which no alternative cells for the first cellular network 106 having an acceptable signal quality have been found. As a further example, operation 610 can additionally or alternatively include the wireless communication device 102 determining a loading on a serving cell of the first cellular network 106 exceeds a threshold, determining that a realized throughput on the first cellular network 106 fails to satisfy a threshold, determining that a level of congestion on the first cellular network 106 exceeds a threshold, and/or the like.

Operation 620 can include the wireless communication device 102 sending a notification that the wireless communication device 102 is releasing the voice call to transition to the legacy cellular network 108 and will resume the voice call on the legacy cellular network 108. In some example embodiments, operation 620 can include sending the notification to the remote device 104, such as described in connection with the embodiment described in accordance with operation 325 of FIG. 3. As another example, in some example embodiments, operation 620 can include sending the notification to a network entity, which can be configured to, in turn, provide notification to the remote device 104 that the wireless communication device 102 is releasing the voice call to transition to the legacy cellular network 108 and will resume the voice call on the legacy cellular network 108, such as described in connection with the network coordinated approach of the embodiment described in accordance with operation 425 of FIG. 4.

In some example embodiments, the notification of operation 620 can be provided via IMS SIP signaling. As another example, in some example embodiments, the notification of operation 620 can be indicated in an RTP packet payload, such as via one or more reserved bits of the CMR field of an RTP packet.

Operation 630 can include the wireless communication device 102 releasing the voice call on the first cellular network 106. Operation 630 can, for example, include sending a SIP BYE message to the remote device 104 to release the call. In some example embodiments, operation 630 can also include releasing the voice call with the network so that the network does not view the call termination as a call drop.

Operation 640 can include the wireless communication device 102 providing indication via the device user interface that the voice call is still ongoing. Operation 640 can be continued through transition to the legacy cellular network 108 (e.g., operation 650) and reestablishment of the voice call (e.g., operation 660).

Operation 650 can include the wireless communication device 102 transitioning to the legacy cellular network 108. Operation 660 can include the wireless communication device 102 establishing a second voice call with the remote device 104 via the connection to the legacy cellular network 108. The second voice call can be serviced on the end terminating at the wireless communication device 102 via a circuit switched domain of the legacy cellular network 108. Operation 670 can include the wireless communication device 102 using the second voice call to resume the voice call with the remote device 104.

In some example embodiments, operations 660 and 670 can be performed automatically after transitioning to the legacy cellular network 108. In this regard, performance of operations 660 and 670 can be transparent to the user interface of the wireless communication device 102 such that the device user does not have to take action to reestablish the voice call. As such, from the user perspective, the user may not know that the call was released and reestablished, as the user interface can continue to indicate that the call is ongoing during the process of transitioning to the legacy cellular network 108 and reestablishing the voice call. In this regard, the user can be provided with the indication at the user interface layer that a single continuous call has been ongoing with the remote device 104.

Figure 7:
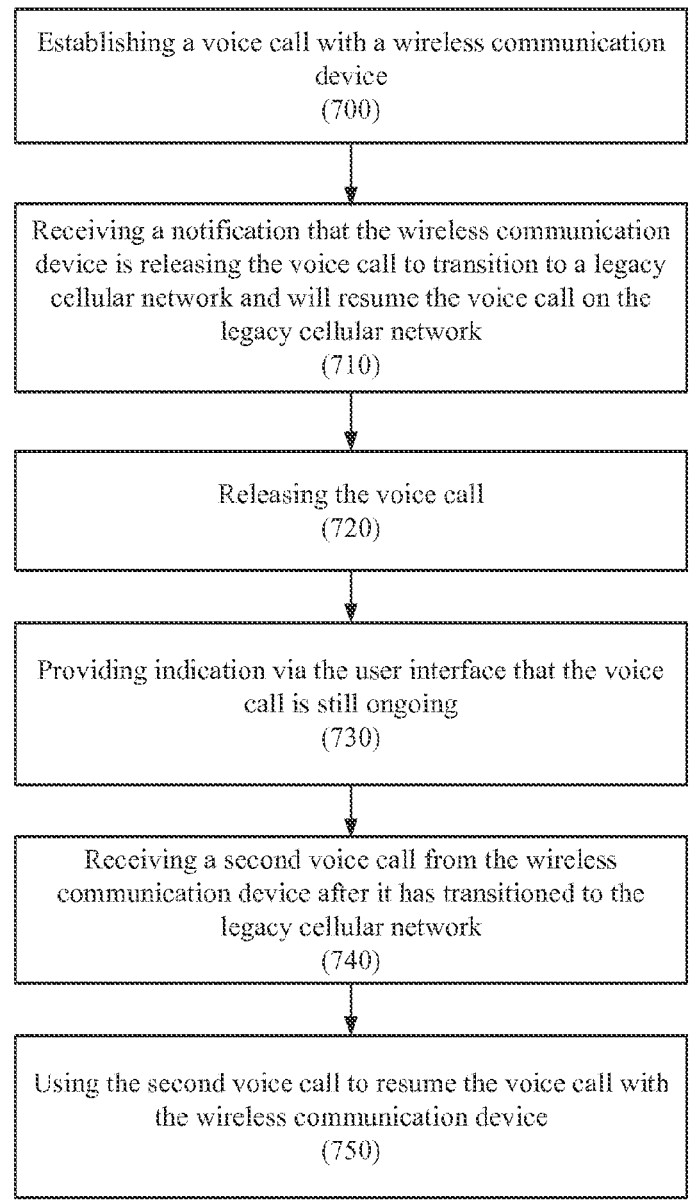
FIG. 7 illustrates a flowchart of operations that can be performed in accordance with an example method for resuming a voice call according to some example embodiments.

FIG. 7 illustrates a flowchart of operations that can be performed in accordance with an example method for resuming a voice call according to some example embodiments. In this regard, FIG. 7 illustrates operations that can be performed by the remote device 104. In embodiments in which apparatus 200 is implemented on the remote device 104, one or more of processing circuitry 210, processor 212, memory 214, transceiver(s) 216, user interface 218, or call continuity manager 220 can, for example, provide means for performing the operations illustrated in and described with respect to FIG. 7.

Operation 700 can include the remote device 104 establishing a voice call with the wireless communication device 102. The voice call can be initiated by either the remote device 104 or the wireless communication device 102. In some example embodiments, operation 700 can include the remote device 104 confirming that the wireless communication device 102 supports a background call resumption feature during the call establishment phase.

Operation 710 can include the remote device 104 receiving a notification that the wireless communication device 102 is releasing the voice call to transition to a legacy cellular network and will resume the voice call on the legacy cellular network. In some example embodiments, the notification can be received from the wireless communication device 102 via end-to-end communication. As another example, in some example embodiments, such as in the network-coordinated approach illustrated in and described with respect to FIG. 4, the notification can be provided by a network entity. The notification can, for example, be provided via IMS SIP signaling. As another example, the notification can be indicated in an RTP packet payload, such as via one or more reserved bits of the CMR field of an RTP packet.

Operation 720 can include the remote device 104 releasing the voice call in response to the notification. However, the remote device 104 can provide an indication via the user interface that the voice call is still ongoing after the call has been released, as illustrated by operation 730. In this regard, a user of the remote device 104 can be provided with the impression that the voice call is still ongoing, although the user may experience an interruption in audio transfer for the voice call.

Operation 740 can include the remote device 104 receiving a second voice call from the wireless communication device 102 after the wireless communication device 102 has transitioned to the legacy cellular network 108. Operation 750 can include the remote device 104 using the second voice call to resume the voice call with the wireless communication device 102. Acceptance of the second voice call can be performed in the background without any user input. In this regard, the user can be provided with the indication at the user interface layer that a single continuous call has been ongoing with the wireless communication device 102.

In some embodiments, the wireless communication device 102 and/or remote device 104 can be configured to use an identity of the other device to discern any calls from other parties that can arrive during the period of transition between networks and call resumption. For example, the remote device 104 of some example embodiments can correlate an indication of the identity of the first device 302, such as by way of non-limiting example, a Mobile Subscriber Integrated Services Digital Network-Number (MSISDN) of the first device 302, with the call session. When the remote device 104 receives an incoming voice call after the initial voice call with the wireless communication device 102 has been released to allow the wireless communication device 102 to transition to the legacy cellular network 108, the remote device 104 can compare an identity associated with the calling device to the identity of the first device 302 correlated with the call session. If it is the wireless communication device 102 calling the remote device 104, then the remote device 104 can accept the call in the background and resume the call session. If, however, it is a different device calling, then the remote device 104 can provide an indication via the user interface that a new call has been received and let the user decide whether to accept or ignore the call.

As another example, the wireless communication device 102 can examine an identity (e.g., an MSISDN) associated with a device initiating an incoming call that can be received after transitioning to the legacy cellular network 108 before reestablishment of the call with the remote device 104 to determine if the call is from the remote device 104 or another device. If an incoming call is received from a device other than the remote device 104, a user of the wireless communication device 102 can be prompted with an indication that a new call has been received from another device so that the user can decide whether to accept or ignore the call.

Figure 8:
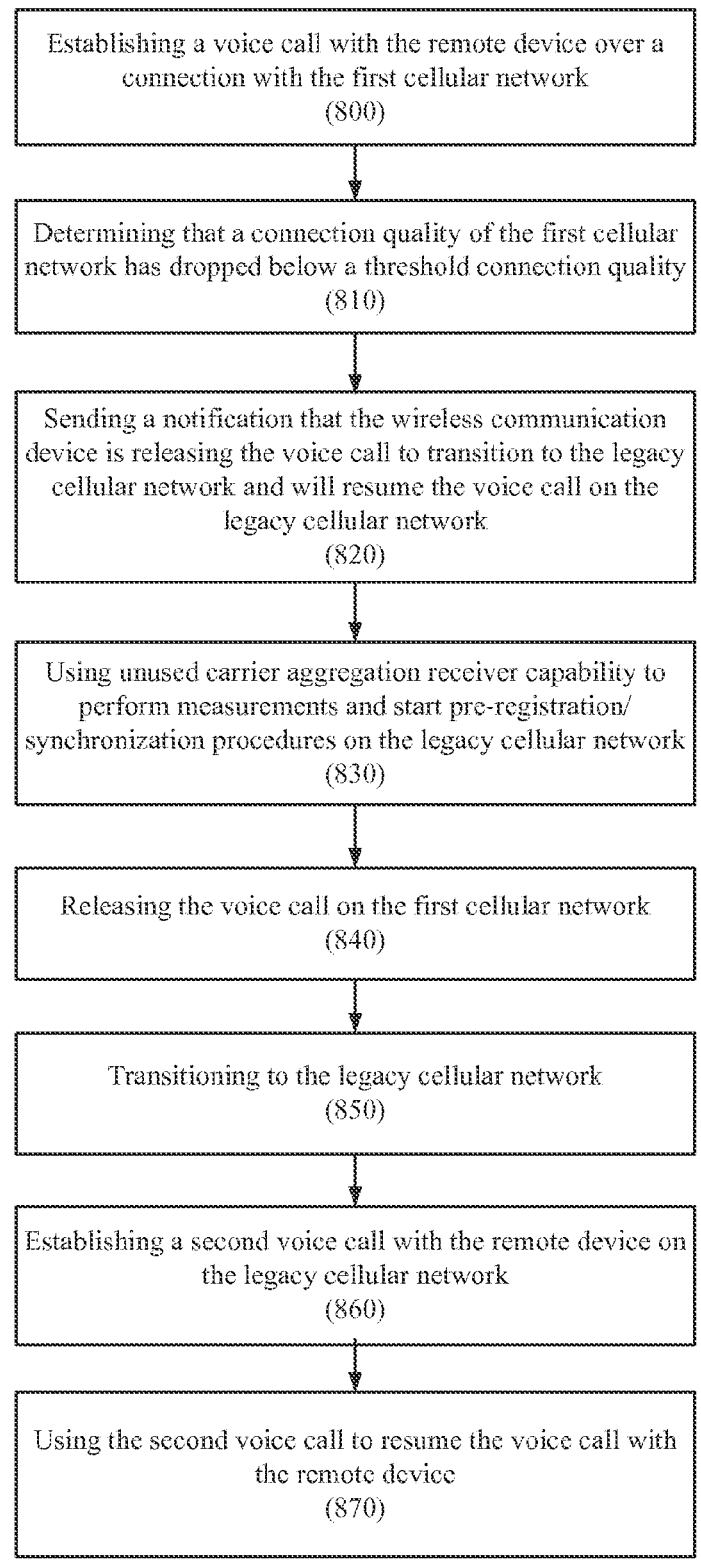
FIG. 8 illustrates a flowchart of operations that can be performed by a wireless communication device having unused carrier aggregation receiver capability in accordance with an example method for resuming a voice call according to some example embodiments.

The wireless communication device 102 of some example embodiments can be configured to support carrier aggregation (CA). In some such example embodiments, if carrier aggregation is not activated, the call continuity manager 220 can be configured to use unused receiver capability to perform measurements and/or start pre-registration/synchronization procedures on the legacy cellular network 108 while a voice call with the remote communication device 104 is still ongoing on the first cellular network 106. Such example embodiments can reduce an amount of time needed to transition to the legacy cellular network 108, and as such can reduce a length of interruption to the voice call when the wireless communication device 102 transitions to the legacy cellular network 108. FIG. 8 illustrates a flowchart of operations that can be performed by a wireless communication device 102 having unused carrier aggregation receiver capability in accordance with an example method for resuming a voice call according to some example embodiments. One or more of processing circuitry 210, processor 212, memory 214, transceiver(s) 216, user interface 218, or call continuity manager 220 can, for example, provide means for performing the operations illustrated in and described with respect to FIG. 8.

Operation 800 can include the wireless communication device 102 establishing a voice call with the remote device 104 over a connection with the first cellular network 106. The voice call can be initiated by either the wireless communication device 102 or the remote device 104. The voice call can be serviced via a PS domain of the first cellular network 106. In some example embodiments, the voice call can be serviced via a VoLTE connection between the wireless communication device 102 and the first cellular network 106. In some example embodiments in which the remote device 104 is connected to an LTE network, the voice call can be an end-to-end VoLTE call. In some example embodiments, operation 800 can include the wireless communication device 102 confirming that the remote device 104 supports a background call resumption feature during the call establishment phase.

Operation 810 can include the wireless communication device 102 determining that a connection quality of the first cellular network 106 has dropped below a threshold connection quality. Operation 810 can be performed based at least in part on measurements of the first cellular network 106 and/or of the legacy cellular network 108 that can be performed by the wireless communication device 102. In this regard, operation 810 can correspond to operation 610, as described in connection with the method of FIG. 6.

Operation 820 can include the wireless communication device 102 sending a notification that the wireless communication device 102 is releasing the voice call to transition to the legacy cellular network 108 and will resume the voice call on the legacy cellular network 108. In this regard, operation 820 can correspond to operation 620, as described in connection with the method of FIG. 6.

Operation 830 can include the wireless communication device 102 using unused carrier aggregation receiver capability to perform measurements and start pre-registration/synchronization procedures on the legacy cellular network 108. In some example embodiments, the wireless communication device 102 can begin to perform operation 830 prior to and/or concurrent with operation 820.

Operation 840 can include the wireless communication device 102 releasing the voice call on the first cellular network 106. The wireless communication device 102 can transition to the legacy cellular network 108, at operation 850. Operation 860 can include the wireless communication device 102 establishing a second voice call with the remote device 104 via the connection to the legacy cellular network 108. The second voice call can be serviced on the end terminating at the wireless communication device 102 via a circuit switched domain of the legacy cellular network 108. Operation 870 can include the wireless communication device 102 using the second voice call to resume the voice call with the remote device 104.

In some example embodiments, the wireless communication device 102 can provide an indication via the device user interface that the voice call is still ongoing while transitioning from the first cellular network 106 to the legacy cellular network 108 (e.g., during performance of operations 840-870).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for resuming a voice call on a legacy cellular network, the method comprising a wireless communication device:
   establishing the voice call with a remote device over a first connection between the wireless communication device and the remote device via a Long Term Evolution (LTE) network, the voice call being serviced as a voice over LTE (VoLTE) call on the LTE network;
   determining that a connection quality of the LTE network has dropped below a threshold connection quality;
   sending a notification that the wireless communication device is releasing the voice call from the LTE network to transition to a legacy cellular network and to resume the voice call on the legacy cellular network;
   releasing the voice call on the LTE network by terminating the voice call on the LTE network at an Internet Protocol Multimedia Subsystem (IMS) layer;
   providing an indication via a user interface of the wireless communication device that the voice call is ongoing during a period between releasing the voice call on the LTE network and establishing a second connection with the remote device via the legacy cellular network;
   transitioning to the legacy cellular network in response to the connection quality of the LTE network dropping below the threshold connection quality, the legacy cellular network having a circuit switched domain for supporting voice calls;
   establishing the voice call with the remote device over the second connection via the legacy cellular network, the second connection being provided via the circuit switched domain of the legacy cellular network; and
   using the second connection to resume the voice call with the remote device.

2. The method of claim 1, wherein establishing the second connection and using the second connection to resume the voice call with the remote device are performed automatically after transitioning to the legacy cellular network.

3. The method of claim 1, wherein establishing the second connection and using the second connection to resume the voice call with the remote device is transparent to the user interface of the wireless communication device.

4. The method of claim 1, wherein sending the notification comprises sending a real-time transport protocol (RTP) packet to the remote device.

5. The method of claim 1, wherein sending the notification comprises sending the notification to a network entity, the network entity being configured to provide notification to the remote device that the wireless communication device is releasing the voice call to transition to the legacy cellular network and to resume the voice call on the legacy cellular network.

6. The method of claim 1, further comprising the wireless communication device confirming that the remote device supports a background call resumption feature when establishing the voice call via the LTE network.

7. The method of claim 1, further comprising the wireless communication device:
   performing a measurement of the legacy cellular network while engaged in the voice call on the LTE network; and
   selecting to transition to the legacy cellular network based at least in part on the measurement of the legacy cellular network.

8. The method as in claim 1, wherein the indication is displayed on a display associated with the user interface of the wireless communication device.

9. The method as in claim 1, wherein the indication is an audible indication.

10. A wireless communication device comprising:
    at least one transceiver, the at least one transceiver configured to transmit data and receive data via a first cellular network and a legacy cellular network; and
    processing circuitry coupled to the at least one transceiver, the processing circuitry configured to control the wireless communication device to at least:
      establish a voice call with a remote device over a first connection between the wireless communication device and the remote device via the first cellular network, the voice call being serviced via a packet switched domain of the first cellular network;
      determine that a connection quality of the first cellular network has dropped below a threshold connection quality;
      send a notification via a first session initiation protocol (SIP) message to the remote device that the wireless communication device is releasing the voice call to transition to the legacy cellular network and to resume the voice call on the legacy cellular network;
      receive an acknowledgement via a second SIP message from the remote device;
      release the voice call on the first cellular network;
      provide an indication via a user interface of the wireless communication device that the voice call is ongoing during a period between releasing the voice call on the first cellular network and establishing a second connection with the remote device via the legacy cellular network;
transition to the legacy cellular network in response to the connection quality of the first cellular network dropping below the threshold connection quality, the legacy cellular network having a circuit switched domain for supporting voice calls;
establish the voice call with the remote device over the second connection via the legacy cellular network, the second connection being provided via the circuit switched domain of the legacy cellular network; and
use the second connection to resume the voice call with the remote device.

11. The wireless communication device of claim 10, wherein the processing circuitry is configured to control the wireless communication device to establish the second connection and use the second connection to resume the voice call with the remote device automatically after transitioning to the legacy cellular network.

12. The wireless communication device of claim 10, wherein establishment of the second connection and usage of the second connection to resume the voice call with the remote device is transparent to the user interface of the wireless communication device.

13. The wireless communication device of claim 10, wherein the processing circuitry is further configured to control the wireless communication device to provide an indication via the user interface of the wireless communication device that the voice call is ongoing during a period between releasing the voice call on the first cellular network and establishing the voice call on the legacy cellular network.

14. The wireless communication device of claim 10, wherein the processing circuitry is configured to control the wireless communication device to send the notification to the remote device.

15. The wireless communication device of claim 10, wherein the processing circuitry is configured to control the wireless communication device to send the notification to a network entity, the network entity being configured to provide notification to the remote device that the wireless communication device is releasing the voice call to transition to the legacy cellular network and to resume the voice call on the legacy cellular network.

16. The wireless communication device of claim 10, wherein the processing circuitry is further configured to use unused carrier aggregation receiver capability to perform measurements and/or to start pre-registration procedures on the legacy cellular network while the voice call with the remote device is ongoing on the first cellular network.

17. A non-transitory computer-readable storage medium, storing a set of computer program instructions for resuming a voice call on a legacy cellular network, that when executed by one or more processors of a wireless communication device, cause the wireless communication device to:
establish the voice call with a remote device over a first connection between the wireless communication device and a first cellular network, the voice call being serviced via a packet switched domain of the first cellular network;
determine that a connection quality of the first cellular network has dropped below a threshold connection quality;
send a notification via a first session initiation protocol (SIP) message to the remote device that the wireless communication device is releasing the voice call from the first cellular network to transition to a legacy cellular network and to resume the voice call on the legacy cellular network;
receive an acknowledgement via a second SIP message from the remote device;
release the voice call from the first cellular network;
provide an indication via a user interface of the wireless communication device that the voice call is ongoing during a period between releasing the voice call on the first cellular network and establishing a second connection with the remote device via the legacy cellular network;
transition to the legacy cellular network in response to the connection quality of the first cellular network dropping below the threshold connection quality, the legacy cellular network having a circuit switched domain for supporting voice calls;
establish the voice call over the second connection with the remote device via the legacy cellular network, the second connection being provided via the circuit switched domain of the legacy cellular network; and
use the second connection to resume the voice call with the remote device.

18. The non-transitory computer-readable storage medium of claim 17, wherein establishing the second connection and using the second connection to resume the voice call with the remote device is transparent to the user interface of the wireless communication device.

19. The non-transitory computer-readable storage medium of claim 17, further comprising program code for providing an indication via the user interface of the wireless communication device that the voice call is ongoing during a period between releasing the voice call on the first cellular network and establishing the second connection on the legacy cellular network.

20. The non-transitory computer-readable storage medium of claim 17, further comprising program code for confirming that the remote device supports a background call resumption feature when establishing the voice call via the first cellular network.

21. The non-transitory computer-readable storage medium of claim 17, wherein the first cellular network utilizes a Long Term Evolution (LTE) radio access technology, the voice call being serviced as a voice over LTE (VoLTE) call on the first cellular network.

22. A method for resuming a voice call following transition of a remote wireless communication device from a first cellular network to a legacy cellular network, the method comprising a communication device:
establishing the voice call with the remote wireless communication device;
receiving a notification that the remote wireless communication device is releasing the voice call to transition from a first cellular network to the legacy cellular network and to resume the voice call on the legacy cellular network;
releasing the voice call in response to receipt of the notification;
providing an indication via a user interface of the communication device that the voice call is ongoing during a period between releasing the voice call from the first cellular network and receiving the voice call from the remote wireless communication device after the remote wireless communication device has transitioned to the legacy cellular network;

receiving the voice call from the remote wireless communication device after the remote wireless communication device has transitioned to the legacy cellular network; and using the legacy cellular network to resume the voice call with the remote wireless communication device, wherein the remote wireless communication device terminates the voice call with the first cellular network at an Internet Protocol Multimedia Subsystem (IMS) layer.

23. The method of claim 22, further comprising the communication device:

confirming that the remote wireless communication device supports a background call resumption feature when establishing the voice call.

24. The method of claim 22, wherein receiving the notification comprises receiving a notification sent by the remote wireless communication device.

25. The method of claim 22, wherein receiving the notification comprises receiving a notification provided by a network entity.

* * * * *